May 16, 1961 E. C. DENCH 2,984,763

MAGNETRON OSCILLATORS

Original Filed Oct. 30, 1951 3 Sheets-Sheet 1

INVENTOR
EDWARD C. DENCH
BY Elmer J. Gorn
ATTORNEY

May 16, 1961

E. C. DENCH 2,984,763

MAGNETRON OSCILLATORS

Original Filed Oct. 30, 1951

3 Sheets-Sheet 2

INVENTOR
EDWARD C. DENCH
BY Elmer J. Gorn
ATTORNEY

INVENTOR
EDWARD C. DENCH
BY Elmer J. Gorn
ATTORNEY

United States Patent Office 2,984,763

Patented May 16, 1961

2,984,763

MAGNETRON OSCILLATORS

Edward C. Dench, Needham, Mass., assignor to Raytheon Company, a corporation of Delaware Original application Oct. 30, 1951, Ser. No. 253,879. Divided and this application Mar. 19, 1957, Ser. No. 647,044

6 Claims. (Cl. 315—39.3)

This is a division of my application, Serial No. 253,879, filed October 30, 1951, now abandoned.

This invention relates to electron discharge devices and more particularly to high-frequency oscillation generating devices of the magnetron type.

In copending application, Serial No. 251,326, filed October 15, 1951, by William C. Brown and Edward C. Dench, now abandoned, there is disclosed a magnetron oscillator utilizing a traveling wave amplifier whose output is mismatched to the anode structure at the operating frequency of the device. This invention discloses that the operating frequency of the device may be tuned over a relatively wide range of frequencies by varying the reactance of a tuning structure which may be connected to either the signal input or the signal output of a traveling wave amplifier. At a particular frequency, the tuner will resonate with the signal transmission network of the amplifier such that signal reflections will occur with the proper phase to produce oscillations. The reactive tuner may be, for example, a length of transmission line connected to the amplifier, said transmission line being either short-circuited or open-circuited at its free end. Tuning of such a structure may be accomplished by varying the effective length of the line, for example, by varying the position of a short-circuit placed across the line.

This invention further discloses that the operating frequency of the device may be controlled by varying the anode voltage applied to the traveling wave amplifier. It has been found that a particular tuner will resonate with the transmission network at a plurality of different discrete frequencies which are actually different operating modes of the device. Since the phase velocity of a wave along the transmission network varies with frequency, and, since the velocity of the electrons moving along paths adjacent the network must have velocities on substantially the same order as the velocity of a component of the wave moving along the network, the desired discrete frequency or mode at which the device may be made to operate can be selected by adjustment of the anode voltage. Since the anode voltage for any particular mode frequency of operation of the device is not highly critical, tuning of the device over a limited range of frequencies may be accomplished by merely varying the reactive tuner without varying the anode potential.

There is disclosed herein a first embodiment of the invention wherein the signal wave transmission network comprises an anode structure made up of a plurality of anode members with alternate anode members being connected with anode strapping.

A second embodiment disclosed herein utilizes a signal wave transmission network comprising an unstrapped anode structure. Both types of anode structures may be made to oscillate both above and below the $\pi$ mode frequency dependent on the reactance of the tuning structure.

Other and further objects and advantages of this invention will become apparent as the description thereof progresses, reference being had to the accompanying drawings wherein.

Figure 1:
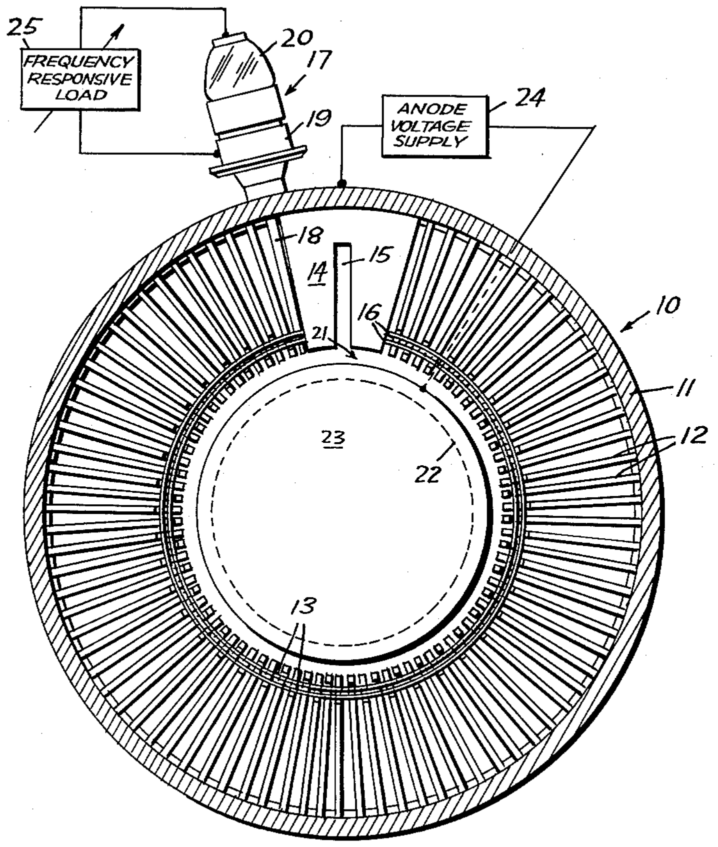
Fig. 1 illustrates a transverse cross-sectional view of a first embodiment of this invention wherein the anode structure comprises a plurality of anode members alternately connected by conductive strapping.
Figure 4:
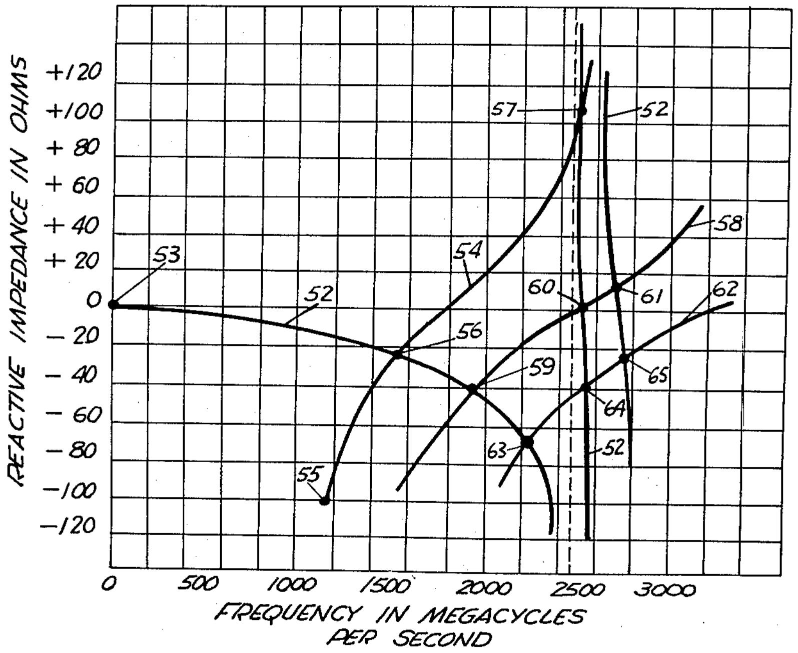
Figure 5:
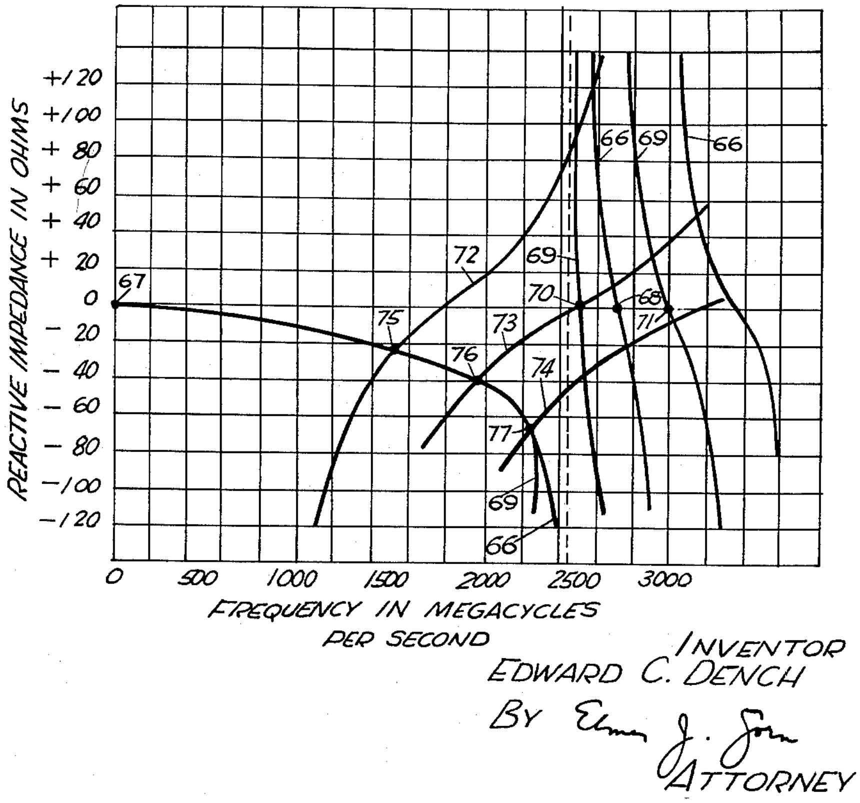

Fig. 4 illustrates a graph showing a plot of the conjugate of the input impedance of a strapped magnetron amplifier anode structure of the type illustrated in Fig. 1, and a plot of the reactance characteristic of a tuner comprising a shorted length of transmission line for three lengths of said line; and Fig. 5 illustrates a graph showing the same information as Fig. 4, but with two tuners, one attached to the input of the amplifier, and one attached to the output of the amplifier.

Referring now to Fig. 1, there is shown an anode structure 10 comprising a metallic cylinder 11. Extending radially inwardly from the inner surface of anode cylinder 11 is a plurality of anode members 12 comprising substantially planar rectangular metallic conductors which are positioned substantially parallel to the axis of anode cylinder 11. Alternate anode members 12 are connected at points adjacent their inner ends on the upper and lower edges thereof by conductive straps 13 according to well-known practice. At one point in the anode structure 10, the anode members 12 and strapping 13 are omitted, and a block of conductive material 14 is substituted therefor. Block 14 occupies the space of several anode members 12. Block 14 is rigidly attached to anode cylinder 11 and extends radially inwardly therefrom for substantially the same distance as the anode members 12. The inner face of block 14 has a slot 15 therein which extends radially outwardly toward anode cylinder 11. Slot 15 is appropriately dimensioned to cause the metallic block 14 to behave as a radio frequency choke at the desired operating frequency of the device. The purpose of the radio frequency choke is to effectively isolate signal waves in the anode structure on one side of the metallic block 14 from being fed through the choke to the anode structure on the other side thereof.

The conductive straps 13 are connected to the metallic block 14 on one side thereof, as at 16, thereby effectively short-circuiting at this point the signal wave transmission network made up of the anode members 12, the conductive strapping 13, and the spaces between the anode members 12 and the strapping 13. An output coupling device 17 is connected to the other end of the signal wave transmission network by connecting one of the straps 13 to a lead-in member 18, which extends outwardly through anode cylinder 11 spaced therefrom. After lead-in member 18 passes outside cylinder 11, it is surrounded by an outer conductor 19 spaced therefrom and coaxial therewith, outer conductor 19 being sealed to the aperture in cylinder 11 through which lead-in member 18 passes. Outer conductor 19 is insulatedly sealed to lead-in member 18 by a glass seal 20 in a well-known manner.

Positioned in the space defined by the inner ends of anode members 12 is a cathode structure 21 comprising a cathode cylinder 22 positioned concentric with anode cylinder 11. The outer surface of cathode cylinder 22 is coated with electron-emissive material, and is adapted to produce clouds of electrons in the space between the cathode cylinder 22 and the inner ends of the anode members 12 when cathode cylinder 22 is heated by a heater coil, not shown, in a well-known manner. The upper and lower ends of cathode cylinder 22 are covered by end shields 23, which tend to prevent movement of the electrons in a direction axial to the cathode cylinder 22.

It is to be clearly understood that the particular details of the cathode structure are disclosed herein by way of example only, and any desired cathode structure or electron source can be used. While the support and lead-in structure for the cathode is not disclosed in this embodiment of the invention, it may be, for example, of the type disclosed in copending application, Serial No. 81,804, filed March 16, 1949, by William C. Brown and Edward C. Dench, now Patent No. 2,673,306. A voltage is produced between the anode structure 10 and the cathode structure 21 by means of an anode voltage supply 24, which is made adjustable in order to select the particular mode in which it is desired that the device shall operate.

A frequency-responsive load 25 is connected to the output coupling device 17. The reactive load 25 may have a resistive component whereby power may be extracted from the device. As used throughout the specification and claims, the term "load" is defined as any device which, upon being coupled to the anode structure, will present an impedance to said structure. The term includes devices which present substantially entirely reactive impedances to the anode structure and are, therefore, substantially lossless, as well as devices which draw power from the anode structure. Specifically, the load 25 could be a transmission line having an end short-circuited, and the other end connected to the output coupling device 17. Power could be extracted from the system by any desired means, such as a load having a resistive component connected to the output device 17 in parallel with the shorted transmission line. The load having the resistive component could also be connected to any desired point on the shorted transmission line or to a desired position on the anode structure, for example, by a conventional output coupling loop or probe or by direct connection to any of the anode members 12 on the straps 13. Load 25 and coupling means 17 may be connected either to the upstream end or the downstream end of the signal wave transmission network comprising anode structure 10, the direction of the stream referring to the flow of the electrons in the interaction space between the cathode cylinder 22 and the anode member 12. As shown in Fig. 1, they are connected to the upstream end if the polarity of the magnetic field is such that electrons move around the cathode counterclockwise, while they are connected to the downstream end if the electrons move clockwise about the cathode. If desired, an additional output coupling device may be coupled to the structure at any point, for example, by a loop coupling, in order that power may be fed out thereby to a resistive load while the load 25 is made substantially a lossless frequency-selective device. An analysis of the operation of this device will be described presently.

Figure 2:
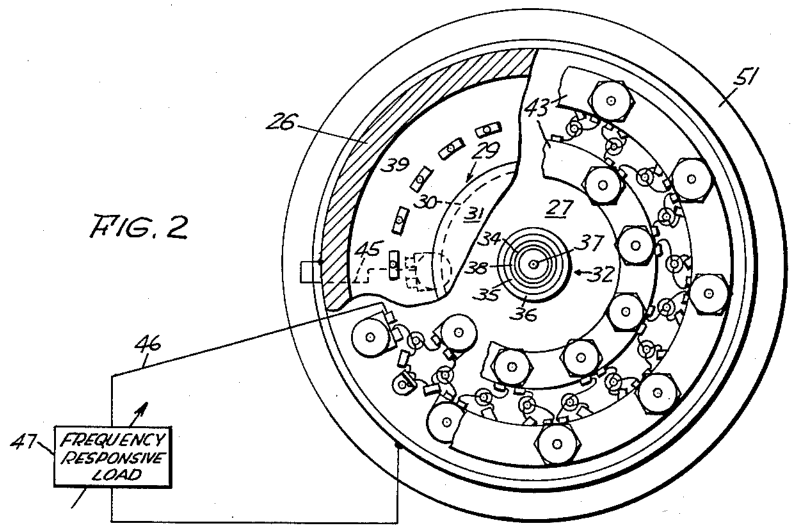
Fig. 2 illustrates a partially broken-away transverse cross-sectional view of the second embodiment of this invention wherein the signal transmission network comprises an unstrapped anode structure wherein lumped constants are connected between adjacent anode members.
Figure 3:
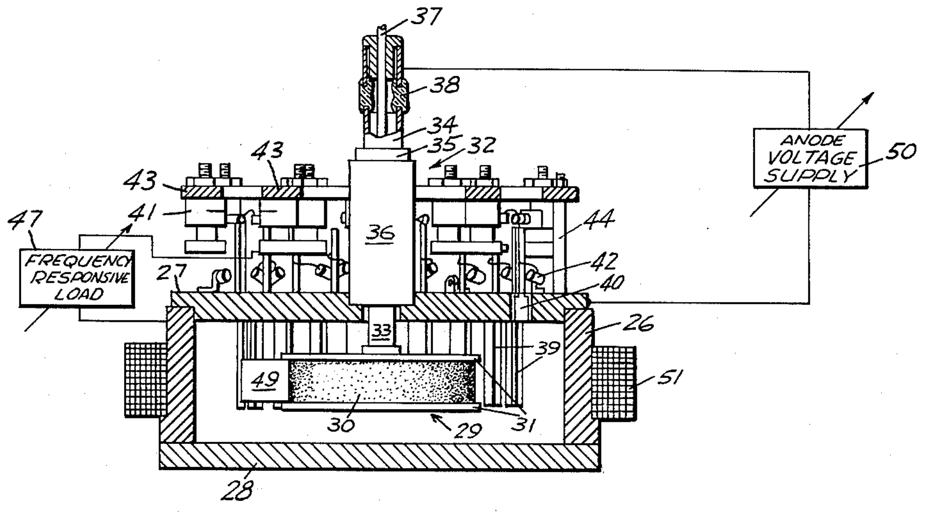
Fig. 3 illustrates a longitudinal cross-sectional view of the device shown in Fig. 2.

Referring now to Figs. 2 and 3, there is shown a further embodiment of this invention wherein the signal transmission network comprises a plurality of adjacent anode members connected together through lumped electrical constants to form an equivalent unstrapped type of anode structure. The anode structure comprises an anode cylinder 26, the ends of which are covered by upper and lower end plates 27 and 28, respectively. Positioned inside anode cylinder 26 is a cathode structure 29 comprising a cathode cylinder 30 whose outer surface is coated with electron-emissive material. The upper and lower ends of cathode cylinder 30 are covered by end shields 31 which extend outwardly beyond cathode cylinder 30. Cathode 29 is rigidly mounted with respect to the anode cylinder 26 by a cathode support structure 32 comprising a cylindrical member 33 attached to one of the end shields 31, and which extends upwardly through an aperture in upper end plate 27, and is rigidly supported with respect thereto by being attached through a cylindrical member 34, and a cup member 35, to a ceramic sleeve 36 surrounding cylinder 33 and sealed to a recess in upper end plate 27. Extending downwardly through cylinder 33 into the cathode structure 29 is a lead-in member 37, which is connected to one end of a heater wire inside cathode cylinder 30, the other end of said heater wire being connected to cathode cylinder 30. Lead-in member 37 is insulatedly sealed to cathode cylinder 34 by an insulating seal 38 so that, by application of a potential between lead-in wire 37 and cylinder 34, a current may be caused to be passed through the cathode heater coil, thereby heating the cathode to the desired electron-emitting temperature.

Surrounding cathode structure 29 is a plurality of anode members 39 comprising elongated conductive members which extend upwardly through upper end plate 27, and are insulatedly supported with respect thereto by insulating beads 40 sealed around anode rods 39 and inside apertures in end plate 27. Extensions of anode members 39 extend upwardly above upper end plate 27 outside anode cylinder 26, said extensions forming terminal posts to which lumped constants may be connected to form with anode members 39 a signal wave transmission network. Specifically, inductors 41 are connected betwee neach pair of adjacent anode members 39, and each anode member 39 is connected to a ground reference plane comprising upper end plate 27 through condensers 42. Inductors 41 are supported on rings 43, which are supported with respect to upper end plate 27 by means of rods 44. At one point in the anode structure, the inductor connecting a pair of adjacent anode members is omitted, said pair of adjacent anode members forming, respectively, the input and output ends of the signal wave transmission line. One end of the transmission line is grounded, as at 45, by connecting the anode member 39 at this point directly to the anode ground plane comprising upper end plate 27. The transmission line structure has the other end thereof connected by means of a lead-in member 46 to one side of a frequency-selective load 47, the other side of which is grounded by being connected to upper end plate 27. A metalic plate 49 is rigidly attached to cathode cylinder 30, and extends radially outwardly therefrom to a point intermediate the anode members 39 which constitute the ends of the transmission line. Thus, electrons emitted from the cathode are prevented from passing completely around the anode structure from the output of the device to the input thereof. If desired, plate 49 may be omitted or, if desired, it may be added in the embodiment of the invention illustrated in Fig. 1. A variable anode supply 50 is connected between the cathode structure and the anode structure whereby the particular mode at which the device will oscillate is controlled by adjustment of the anode-to-cathode voltage. A magnet coil 51 is positioned around anode cylinder 26 whereby the desired magnetic field may be produced in the space between the anode members 39 and the cathode cylinder 30 in a direction transverse to the direction of motion of the electrons.

It is to be clearly understood that any desired means, such as a permanent magnet, could be substituted for the magnet coil illustrated in the species of Fig. 1 and 2, and that either means for producing a magnetic field could be used with the species of Fig. 1.

Referring now to Fig. 4, there is shown a graph illustrating the relationship between frequency and the conjugate of the impedance of a signal wave transmission network of the strapped anode type illustrated in Fig. 1. Frequency in megacycles is plotted along the axis of abscissae while reactive impedance in ohms is plotted along the axis of ordinates. The curve 52 on the graph is indicative of the conjugate of the impedance of the network with respect to frequency, and has a value of zero ohms at zero frequency, as is indicated by the point 53. The curve 52 becomes negative as the frequency is increased until, at a frequency on the order of 2,470 megacycles, it passes to infinity, thereby indicating the presence of the $\pi$ mode. As the frequency is increased above the $\pi$ mode frequency, the curve 52 appears again from the direction of positive infinity, and passes rapidly through zero to minus infinity at a frequency of approximately 2,600 megacycles, which indicates the presence of the first mode adjacent the $\pi$ mode. The curve 52 again appears as a positive impedance at a frequency above 2,600 megacycles, and passes rapidly to a negative reactive impedance. The curve 52 could be computed and plotted for many additional modes as the frequency is increased. However, for purposes of illustration, the curve 52 is plotted only through the first two modes of the operating frequency.

Also plotted on the graph of Fig. 4 is a curve 54 illustrating the reactance of a tuner, which may be used, for example, as the loads 25 or 47, comprising a shorted length of transmission line. For the particular frequencies used, the line to produce the curve 54 was 8.32 centimeters long with one end connected to the output of the signal wave transmission network, and the other end shorted. The curve 54 has a negative reactive impedance of around 100 ohms at a frequency of approximately 1,200 megacycles, as is indicated at point 55. Curve 54 intersects curve 52 at a frequency of approximately 1,550 megacycles, as is indicated by point 56. At this frequency, the tuner will be matched to the anode structure, since the respective impedances are equal in magnitude and opposite in reactance. Therefore, the entire anode structure and tuner will resonate at this frequency, thereby producing oscillations. The curve 54 intersects the curve 52 again at a frequency of approximately 2,500 megacycles at a reactive impedance of approximately plus 105 ohms, as is indicated by point 57. Here the tuner is also matched to the anode structure and will resonate therewith to produce oscillations.

A curve 58 is shown illustrating the reactance of a shorted transmission line which is 6.99 centimeters long. The curve 58 intersects the curve 52 at approximately 1,950 megacycles, as is indicated by point 59, at a reactance of approximately minus 40 ohms. Curve 58 also intersects curve 52 at a frequency of slightly greater than 2,500 megacycles at substantially zero reactance, as is indicated by point 60, and again intersects curve 52 at a frequency of approximately 2,700 megacycles, as is indicated by point 61, at a reactive impedance of approximately 10 ohms. Since the line is matched to the anode structure at each of these points, it will resonate therewith to produce oscillations.

A curve 62 is shown illustrating the reactance of a shorted line which is 4.68 centimeters long. Curve 68 intersects curve 52 at a frequency of approximately 2,250 megacycles, as is indicated by point 63, at a reactive impedance of approximately minus 70 ohms. It again intersects curve 52 at a frequency of approximately 2,550 megacycles, as is indicated by point 64, at an impedance of approximately 40 ohms, and again intersects curve 52 at a frequency of approximately 2,750 megacycles, as is indicated by point 65, at a reactive impedance of approximately minus 25 ohms. Thus, it may be seen that the device may be made to oscillate at a plurality of different points on the curve 52 by varying the length of the line attached to the magnetron structure, as is indicated, for example, by points 56, 59 and 63. The variation of freqeuncy is a function of the line length, and any desired frequency within the region of these points may be produced by adjustment of the length of the tuner line. Operation in a particular mode, for example, the mode comprising all frequencies below the $\pi$ mode, is insured by proper adjustment of the anode voltage. Since phase velocity varies as a function of frequency, and since a component of the phase velocity must approximate the velocity of the electron stream to produce interaction therewith, operation may be limited to any particular mode by adjustment of the anode voltage.

Referring now to Fig. 5, there is shown a plot of the conjugate of the reactive impedance of the transmission line shown in Fig. 1, and a plot of the impedance of the tuner of various lengths of tuner line structure where two tuning lines are used, one tuning line being connected to the input of the device and one line being connected to the output of the device. In such a system, there are two sets of modes, one corresponding to an infinite impedance at the center of the network, and the other corresponding to zero impedance. Along the axis of abscissae is plotted frequency in megacycles, and along the axis of ordinates is plotted reactive impedance in ohms. The set of short-circuited modes is designated by the curve 66, which at zero frequency has an impedance of zero ohms, as is indicated by point 67. Curve 66 passes to minus infinity at a frequency of approximately 2,460 megacycles, and reappears, as frequency is increased, from the direction of positive infinity of reactive impedance. After reappearing, the curve 66 passes through a zero impedance at a frequency of approximately 2,700 megacycles, as is indicated by point 68, and with a further increase of frequency passes to a reactive impedance of minus infinity at a frequency of around 3,000 megacycles. The set of short-circuited modes is represented by the curve 69, which is coincident with curve 66 at zero frequency, as indicated by point 67. However, as the mode frequency is approached, the curve 69 diverges from the curve 66 passing toward a reactive impedance of minus infinity at a more rapid rate. Curve 69 reappears on the other side of the $\pi$ mode as a positive reactive impedance, and passes through zero impedance at the frequency of approximately 2,500 megacycles, as is indicated by point 70, and, as frequency is increased, approaches a minus infinity reactive impedance at a frequency on the order of 2,700 megacycles. As frequency is increased, curve 69 again appears from the direction of positive infinite reactance impedance and passes through a zero impedance at a frequency on the order of 3,000 megacycles, as is indicated by point 71, thence approaching a reactive impedance of minus infinity at a frequency on the order of 3,400 megacycles. Also plotted on the graph of Fig. 4 are the reactive impedances of three transmission lines whose lengths are similar to those plotted on the graph in Fig. 4. These plots, as indicated by curves 72, 73 and 74, respectively, are identical with curves 54, 58 and 62, respectively. Curves 72, 73 and 74 intersect curves 66 and 69 at substantially the same points, as is indicated at 75, 76 and 77, at frequencies of 1,550, 1,950 and 2,250 megacycles, respectively. These are the frequencies below the $\pi$ mode at which the device would operate with the proper anode voltage if both tuners were adjusted to the line lengths indicated. Frequencies intermediate the frequencies of this range could be achieved by varying the length of line of either one or both of the tuners. Similarly, the curves 72, 73 and 74 intersect the curves 66 and 69 at a plurality of points at frequencies above the $\pi$ mode, and selection of particular mode frequency at which it is desired the device shall operate may be achieved for any particular setting of the tuner lines by adjustment of the anode potential.

This completes the description of the particular embodiments of the device disclosed herein. However, many modifications thereof will be apparent to persons skilled in the art without departing from the spirit and scope of this invention. For example, other anode structures, such as interdigital anode structures, could be used, and any desired tuning structure could be substituted for the tuning lines described herein. For example, electrically-tuned cavities could be used. Accordingly, it is desired that this invention not be limited by the particular details of the embodiments described herein, except as defined by the appended claims.

What is claimed is:

1. An electron discharge device comprising a slow wave signal propagating network structure having two mutually uncoupled terminations, a source of electrons spaced along a region adjacent a substantial portion of said network structure, means for directing electrons from said source along paths adjacent said network in a reentrant stream, said network structure including output means coupled to one termination thereof for abstracting output energy, and means including a variable reactive load means coupled to one termination of said structure for varying the operating frequency of said device.

2. An electron discharge device comprising a slow wave signal propagating structure network having two mutually uncoupled terminations, a source of electrons spaced along a region adjacent a substantial portion of said structure, means for directing electrons from said source along paths adjacent said network in a reentrant stream, said network structure having a reflecting termination at one termination thereof and further including output means coupled to the other termination thereof, and means including a variable reactive element for varying the operating frequency of said device.

3. An electron discharge device comprising a slow wave signal propagating network structure having two mutually uncoupled terminations, a source of electrons spaced along a region adjacent a substantial portion of said network structure, means for directing electrons from said source along paths adjacent said network in a reentrant stream, said network structure having a variable reflective termination at one termination thereof and further including output means coupled to the other termination thereof, and means including a variable reactive element for varying the operating frequency of said device.

4. An electron discharge device comprising a slow wave signal propagating network structure having two mutually uncoupled terminations, a source of electrons spaced along a region adjacent a substantial portion of said structure, means for directing electrons from said source along paths adjacent said network in a reentrant stream, said network structure including output means coupled to the upstream termination for abstracting energy, and means for varying the operating frequency of said device.

5. An electron discharge device comprising a slow wave signal propagating network structure having two mutually uncoupled terminations, a source of electrons spaced along a region adjacent a substantial portion of said network structure, means for directing electrons from said source along paths adjacent said network in a reentrant stream, said network structure including output means coupled to the upstream termination for abstracting energy, and means for varying the operating frequency of said device.

6. An electron discharge device comprising a slow wave signal propagating network structure having two mutually uncoupled terminations, a source of electrons spaced along a region adjacent a substantial portion of said network structure, means for directing electrons from said source along paths adjacent said network in a reentrant stream, said network structure including output means coupled to the downstream termination for extracting output energy, and means for varying the operating frequency of said device.

References Cited in the file of this patent

UNITED STATES PATENTS

| | | |
|---|---|---|
| 2,511,407 | Kleen | June 13, 1950 |
| 2,534,503 | Donal et al. | Dec. 19, 1950 |
| 2,546,870 | Sayers | Mar. 27, 1951 |
| 2,582,185 | Willshaw | Jan. 8, 1952 |
| 2,630,544 | Tiley | Mar. 3, 1953 |
| 2,680,811 | Guenard et al. | June 8, 1954 |
| 2,681,427 | Brown et al. | June 15, 1954 |
| 2,735,958 | Brown | Feb. 21, 1956 |